INVENTOR
Horst Hegenbart

April 23, 1968   H. HEGENBART   3,379,057
APPARATUS FOR MEASURING THE POWER OF MOTOR VEHICLES
Filed April 9, 1965   3 Sheets-Sheet 3

INVENTOR
Horst Hegenbart

BY Stevens, Davis, Miller & Mosher
ATTORNEYS

United States Patent Office 3,379,057
Patented Apr. 23, 1968

3,379,057
APPARATUS FOR MEASURING THE POWER OF MOTOR VEHICLES
Horst Hegenbart, Heppenheim an der Bergstrasse, Germany, assignor to Gebr. Hofmann K.G. Maschinenfabrik, Darmstadt, Germany
Filed Apr. 9, 1965, Ser. No. 446,944
Claims priority, application Germany, Apr. 10, 1964, H 52,320
8 Claims. (Cl. 73—117)

ABSTRACT OF THE DISCLOSURE

Motor vehicle power measuring apparatus having means for measuring the rotary speed of the driving wheels of a vehicle at a vehicle receiving station utilizing at least one roller adapted to be rotated by the driving wheels. Flywheel means are rotatably connected to the roller, and a torque measuring means effective to detect the torque required for the acceleration of said flywheel is provided along with means for continuously recording the torque and the speed of rotation on a coordinate system in order to determine the power as a function of the speed of rotation.

---

This invention relates to apparatus for measuring the power of motor vehicles, comprising a meter for the rotary speed and at least one roller or runner driven by the wheels of the vehicle.

It is known to measure the power of motor vehicles on roller test stands. These stands are generally constructed so that the vehicle of which the power is to be measured drives with the wheels of its driving axle onto a pair of rollers which are driven by the wheels and also hold the latter in position during the measuring process. In the course of this process the rollers are braked with an action such that the power can be calculated from the braking moment and the rotary speed measured simultaneously. Fly wheel masses are sometimes fitted to ensure that the test stand runs evenly, but these have nothing directly to do with the measurement of power.

Meters of this type require a relatively large outlay for discharging the heat produced in braking. Moreover the power-measuring process takes a relatively long time, since the braking moment has to be adjusted and measured at different speeds each time. For this last reason meters or so-called functional test stands have already been proposed, wherein the brake has a fixed characteristic and only the maximum speed reached is measured. From this one can reach conclusions about the power given off and/or the orderly functioning of the drive motor. So here again the power is determined indirectly from the braking moment.

The aim of the present invention is to remove the disadvantages of known meters for measuring the power of motor vehicles and to propose an apparatus with the aid of which the power can be determined during the measuring run and without braking.

According to the invention there is provided apparatus for measuring the power of motor vehicles, comprising a rotary speed measuring device and at least one roller rotated by the wheels of a vehicle, wherein the roller is rotationally connected to a fly wheel mass and a torque measuring member senses the torque required to drive the fly wheel mass, and wherein the torque value sensed, together with the associated rotary speed value, is recorded on a co-ordinate reading to determine the power value dependent on rotary speed.

The invention thus resides in the idea of coupling a fly wheel mass to the roller driven by the wheels of the vehicle and using the torque required to drive the fly wheel mass to determine the power of the vehicle.

The invention offers some advantages over conventional meters. It enables the power to be indicated directly during the run, i.e. the power can be recorded continuously and automatically at any speed. Operation is extremely simple; there are no different braking moments to adjust as previously; the preferred embodiments require no electrical installations and—since the measurement of braking moments is dispensed with—cooling is not necessary.

According to a preferred embodiment of the invention, the torque measuring member is inserted between the roller and the fly wheel mass and is desirably in the form of a quick return or transmission gearing.

In another preferred embodiment of the invention the torque measuring member is in the form of a torque measuring hub.

The meter according to the invention may be designed so that the co-ordinate reading records the rotary speed along the abscissa and the torque or the power in dependence on the rotary speed along the ordinate.

It is preferred that the co-ordinate reading means comprises a stylus pointer which moves in the direction of the ordinate in proportion to the torque sensed; the rotary speed measuring device moves a writing base in the direction of the abscissa in dependence on the rotary speed, so that the pointer inscribes the torque as a function of the rotary speed.

In another preferred embodiment of the invention, when the torque measuring member responds it deflects a pivotable lever in such a way that the tangent of the angle of pivoting, measured on the co-ordinate indicator in the direction of the ordinate, is proportional to the torque; in this preferred embodiment the device measuring the rotary speed operates in a straight line in the direction of the abscissa and, when it responds, moves a pointer on the lever in the direction of the axis of the latter, so that the pointer indicates and/or records the power proportional to the product of the torque and the rotary speed.

Finally the device for measuring the rotary speed may, according to the invention, be in the form of an eddy current brake, so that the reading obtained can be proportional to the rotary speed.

The invention will now be further described with reference to the accompanying drawings, in which.

Figure 1:
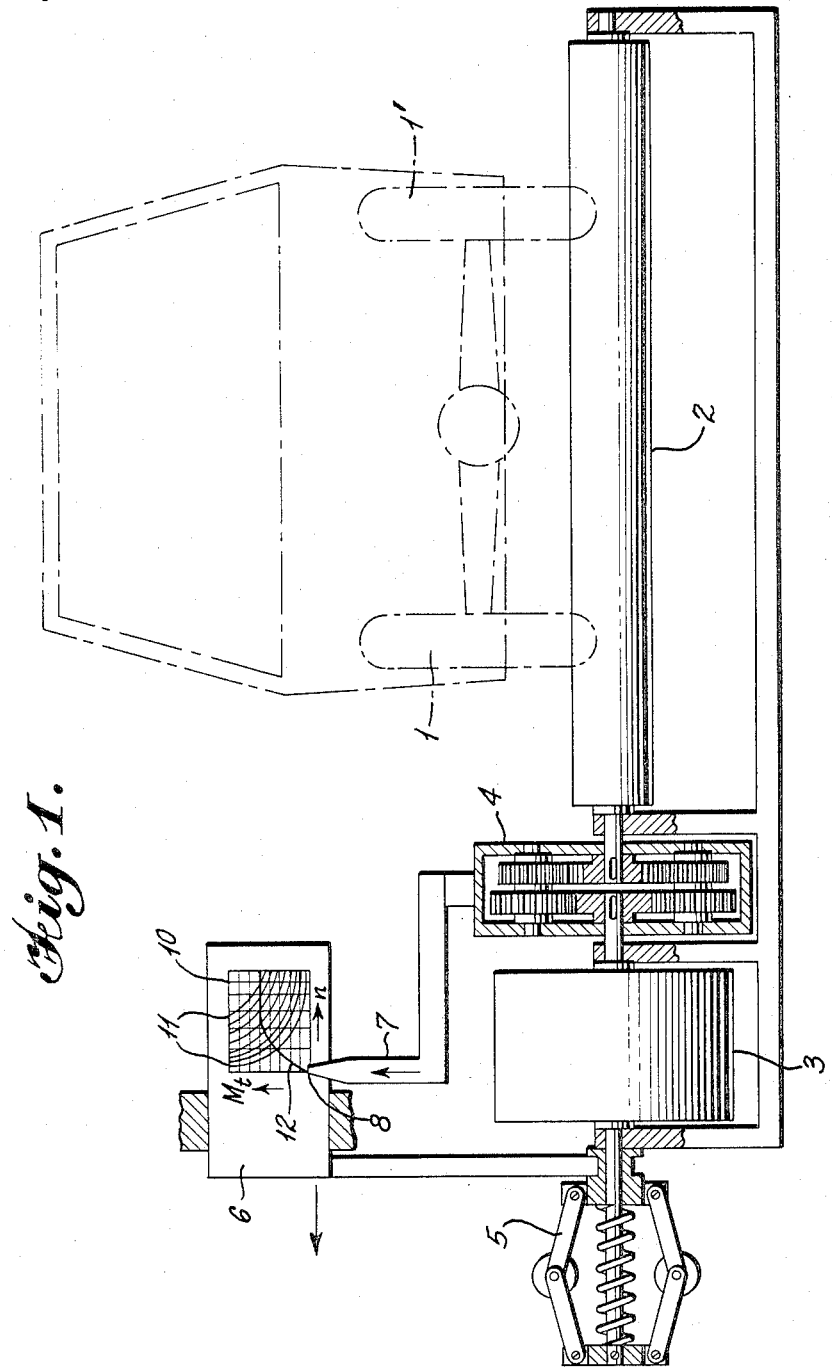
FIG. 1 is a front elevation of a preferred embodiment of a measuring apparatus according to the invention.
Figure 2:
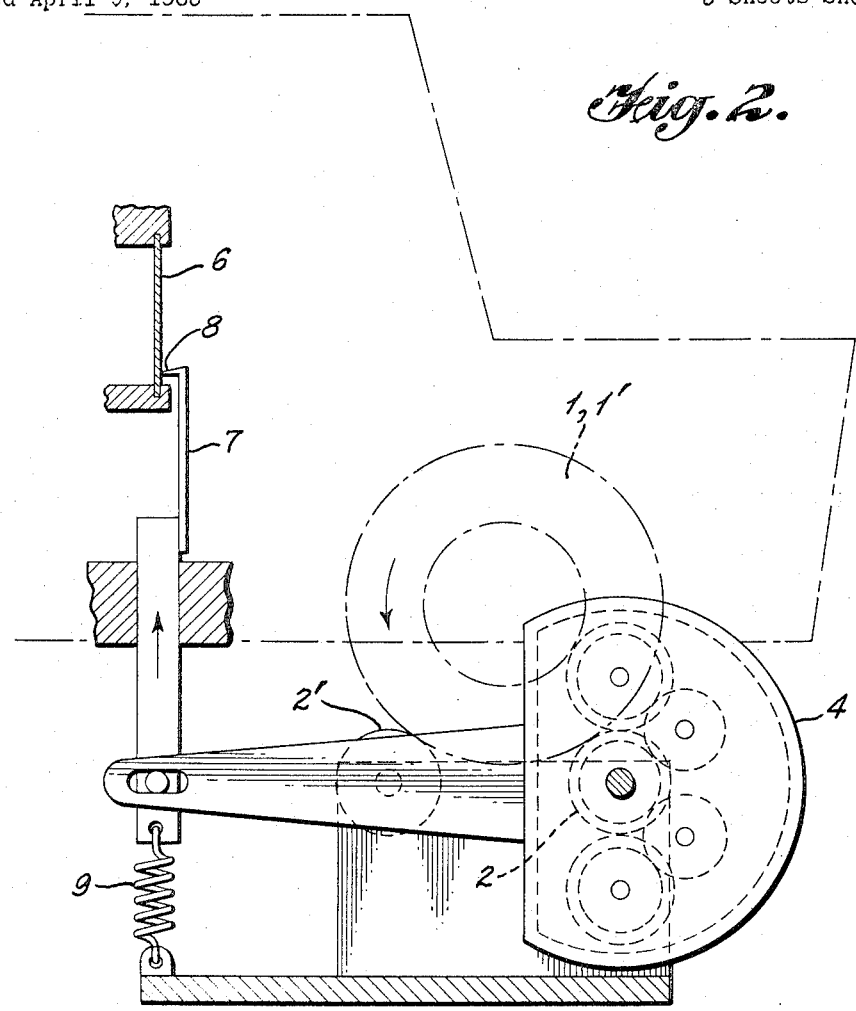
FIG. 2 is a side elevation of the measuring apparatus shown in FIG. 1.

Referring to FIGS. 1 and 2 of the drawings, the measuring apparatus according to the invention comprises a pair of rollers or runners 2, 2′ onto which the vehicle of which the power is to be measured is driven with the wheels 1, 1′ of its driving axle. A fly wheel mass 3 which is driven by the rollers during the measuring run is rotationally connected to the rollers. The torque arising between the fly wheel mass 3 and the rollers is measured with a torque-measuring hub 4 or on the basis of the reaction moment of a quick return or transmission gearing. In the embodiment illustrated the torque measuring member 4 is shown diagrammatically as a quick return gearing. The torque arising in each case is converted (e.g. by a measuring spring) into a recordable pointer deflection or displacement. The rotary speed and thus the peripheral speed of the roller is measured at the same time by means of a rotary speed measuring device 5, connected to the fly wheel mass 3 and shown in FIG. 1 as a device for measuring centrifugal force. The torque ascertained and the associated speed then reveal the power of the vehicle by means of a recording panel 6.

The recording panel 6 is moved preferably perpendicular to the torque measuring direction chosen as the ordinate, in dependence on the rotary speed measured. In FIG. 1, the panel 6 is moved to the left (direction of abscissa). Fixed on the recording panel is a graph diagram 10 in which the power measured can be read from the position of a stylus indicator 8 coupled to the torque measuring member 4. A measuring curve is thus obtained, from which the power of the driving wheels can be read in dependence on the rotary speed—which corresponds to the driving speed of the vehicle.

When a torque arises the member 4 at the same time moves a pointer 7 upwardly (direction of ordinate) together with the stylus 8. The measuring spring 9 ensures that the displacement is dependent on the torque measured. In the graph diagram 10 the rotary speed "$n$" can be read towards the right and the torque measured "$Mt$" in an upward direction. A family of curves 11 comprising lines of constant power is also shown in the graph diagram. The curve 12 is inscribed in the diagram by the stylus 8 as the range of speeds is passed through. With the aid of the curves 11 the power associated with every speed can then be read from the diagram.

Figure 4:
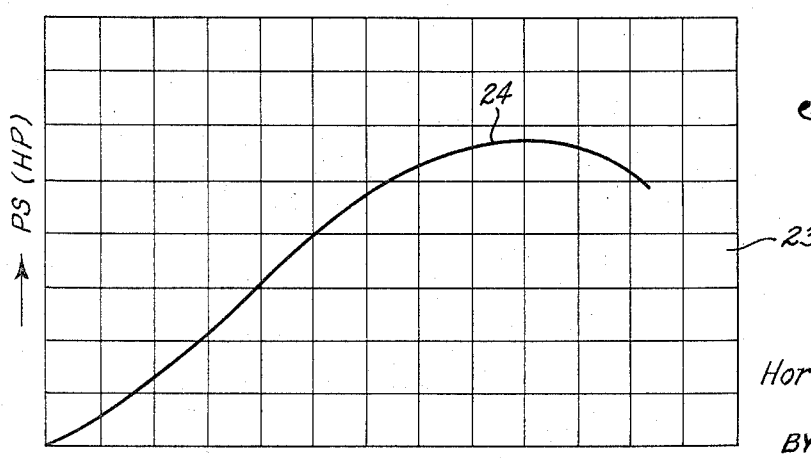
FIG. 4 is a measurement curve obtained with the apparatus shown in FIG. 3.
Figure 3:
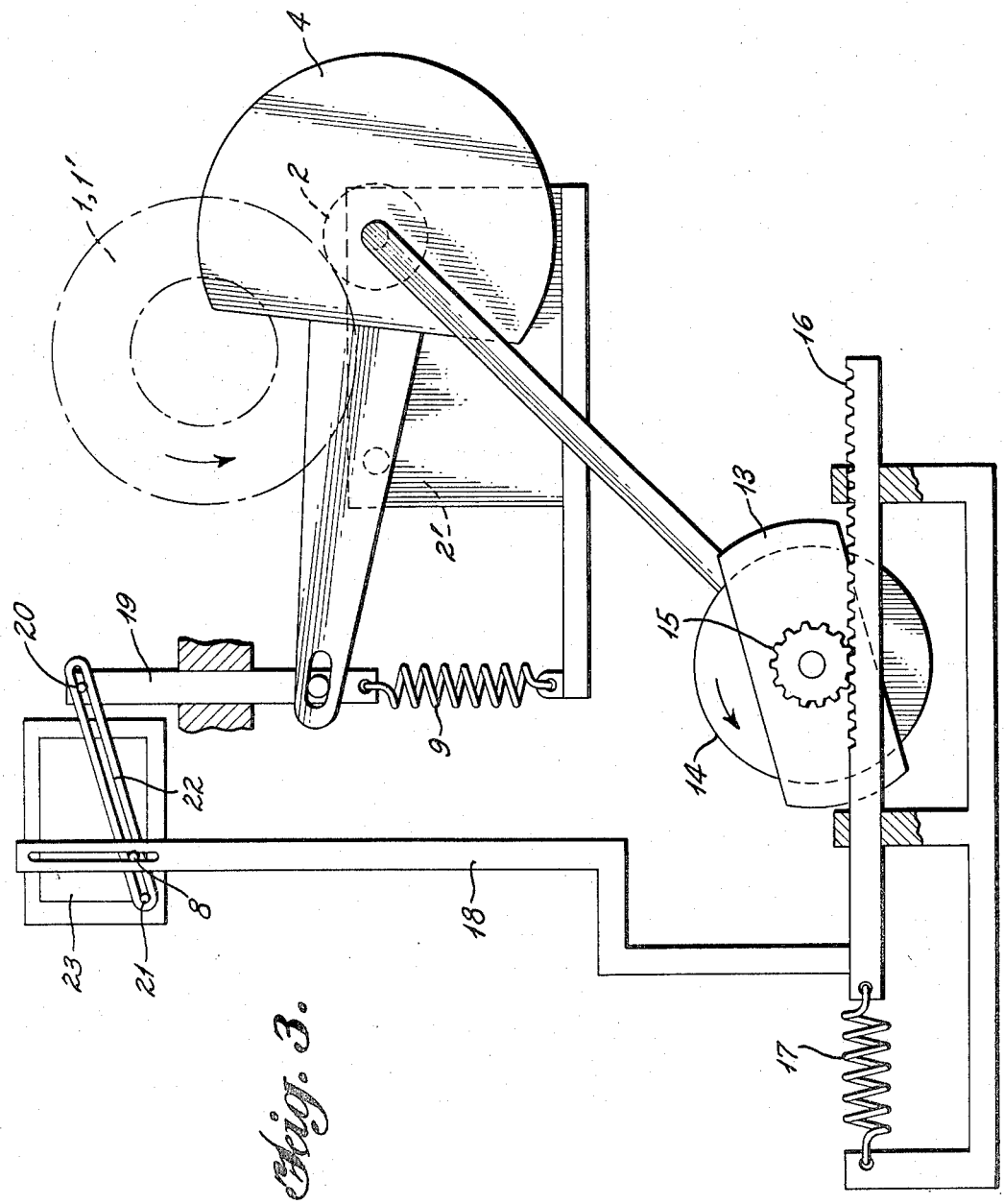
FIG. 3 shows a second preferred embodiment of a measuring apparatus according to the invention.

If the power is to be recorded in a linear co-ordinate system, the appropriate apparatus is the one which will now be described and which is diagrammatically illustrated in FIG. 3, with a linear co-ordinate reading. In this embodiment of the invention the speed is measured so that the associated reading is proportional in each case to the measured speed. This is done, as shown, with an eddy current brake. This comprises a round disc 14 moving past a magnetic pole shoe 13 so that eddy currents are produced in the disc and in turn make the pole shoe 13 with a toothed wheel 15 attached thereto rotate. The rotation of the wheel 15 is transmitted by a toothed rack 16 to a measuring spring 17. This ensures that the displacement of the toothed rack and the bar 18 connected thereto is proportional to the rotary speed. Machined in the bar 18 is a slot in which a measuring pin or stylus 8 can slide. At the same time the torque measured with the aid of the spring 9 is converted into a vertical displacement by a slide 19 on which there is a pin 20. The pin 20 turns a lever 22 mounted about the fulcrum 21 in such a way that the tangent of the angle of pivoting is proportional to the measured torque. The lever 22 again contains a slot in which the stylus 8 likewise slides. This arrangement ensures that the stylus 8 will inscribe the power curve on a co-ordinate sheet 23 in dependence on the speed, i.e. proportionally to the product of torque and rotary speed. FIG. 4 shows the co-ordinate sheet 23 again on a large scale. The curve 24 is an example of a power curve plotted according to the invention and shows how easily the graph can be interpreted.

If the fly wheel mass is suitably large the measuring error resulting from the acceleration of the non-measured masses such as the rollers, the wheels of the vehicle and the transmission members within the vehicle becomes so slight as to be insignificant for the result. As the increase in velocity need take place only very slowly, the acceleration power measured virtually corresponds approximately to the power actually ascertained in correct power measurement at constant rotary speed. Differences between the actual power and the acceleration power measured can in any case be determined by comparative measurements and expressed as a correction factor which would always be the same for a given type of vehicle, once measured. This may be necessary chiefly in cases where, in order to cut down expense, a relatively small fly wheel weight is used to enable the measurement to be carried out rapidly.

The use—according to the invention—of the fly wheel mass as an aid to torque measurement does not of course mean that other loading members cannot be fitted. But such members must be designed so that the maximum speed of the vehicle is always reached and not—as a result of the characteristic of the loading members—so that a lower maximum speed is obtained as the final speed.

In addition to the fly wheel mass other devices which load the engine and go into the resultant measurement may be provided, particularly fans, generators and brakes such as eddy current or water eddy ones.

I claim:

1. Motor vehicle power measuring apparatus comprising a vehicle receiving station, means for measuring the rotary speed of the driving wheels of the vehicle at the station, at least one roller at said station adapted to be rotated by said driving wheels, flywheel means rotatably connected to said roller, a torque measuring means effective to detect the torque required for the acceleration of said flywheel and means for continuously recording the torque and the speed of rotation on a coordinate system in order to determine the power as a function of the speed of rotation.

2. Apparatus as claimed in claim 1, wherein said torque measuring member is in the form of a torque measuring hub.

3. Apparatus as claimed in claim 1, wherein said torque measuring member is positioned between said roller and said fly wheel means and is adapted to be driven by said roller.

4. Apparatus as claimed in claim 3, wherein said torque measuring member is in the form of a quick return gearing.

5. Apparatus as claimed in claim 1 wherein said measured rotary speed is recorded along the abscissa and said measured torque is recorded along the ordinate of said co-ordinate reading.

6. Apparatus as claimed in claim 5, comprising in addition a stylus pointer adapted to be moved in the direction of the ordinate of said co-ordinate reading in proportion to the torque sensed to record said torque on said reading, wherein said means for measuring the rotary speed comprises a writing support movable in the direction of the abscissa in dependence on the rotary speed, said pointer inscribing the torque on said writing support as a function of the rotary speed.

7. Apparatus as claimed in claim 5, comprising in addition a pivotable lever, deflectable in response to said torque measuring member and the tangent of the angle of pivoting of said lever, measured on the co-ordinate reading in the direction of the ordinate, being proportional to the torque and a stylus pointer movable on said lever in the direction of the longitudinal axis of said lever, said stylus pointer being operable in the direction of the abscissa of said co-ordinate reading in dependence on said rotary speed and serving to indicate and record the power proportional to the product of said torque and rotary speed.

8. Apparatus as claimed in claim 7, wherein said means for measuring the rotary speed is in the form of an eddy current brake.

References Cited

UNITED STATES PATENTS

| 1,980,184 | 11/1934 | Butcher | 73—137 X |
| 2,019,755 | 11/1935 | Zerbe et al. | 73—136 |
| 2,245,784 | 6/1941 | James | 73—519 X |
| 2,464,708 | 3/1949 | Moseley | 73—137 X |
| 2,721,109 | 10/1955 | Ross | 73—89 X |
| 3,059,464 | 10/1962 | Deane | 73—116 |
| 3,289,471 | 12/1966 | Maxwell | 73—117 |

RICHARD C. QUEISSER, *Primary Examiner.*

J. W. MYRACLE, *Assistant Examiner.*